United States Patent [19]

Debreuille

[11] 4,255,975
[45] Mar. 17, 1981

[54] DEVICE FOR THE PRECISE MEASUREMENT OF MOVEMENTS OR DEFORMATIONS

[75] Inventor: Pierre-Jean Debreuille, Paris, France

[73] Assignee: Coyne et Bellier, Bureau 'Ingenieurs Conseils, France

[21] Appl. No.: 38,035

[22] Filed: May 11, 1979

[30] Foreign Application Priority Data

Aug. 25, 1978 [FR] France ............................ 78 24650

[51] Int. Cl.³ ............................................. G01L 1/14
[52] U.S. Cl. ...................................... 73/784; 33/313; 73/313; 73/803; 73/141 A
[58] Field of Search ................ 73/784, 763, 313, 803, 73/141 A; 307/240, 132 E; 336/30; 33/148 H, 147 N, 313

[56] References Cited

U.S. PATENT DOCUMENTS

| | | | |
|---|---|---|---|
| 2,662,223 | 12/1953 | Brewer | 336/30 X |
| 2,932,972 | 4/1960 | Cosby et al. | 336/30 X |

Primary Examiner—Jerry W. Myracle
Attorney, Agent, or Firm—Karl W. Flocks

[57] ABSTRACT

A device for measuring movements or deformations has at least one pair of variable reactance movement pick-ups, each pick-up comprising transducer elements whereby a modified inductive or capacitive reactance signal is generated by each pick-up in response to the movements or deformations. The variations of the reactances of the two pick-ups are arranged to be equal but opposite. An electrical oscillator is connected alternately to the two pick-ups by automatic switching elements, and each pick-up alters the oscillation frequency in dependence upon the variation of its reactance. The required measurement is derived from the difference between the two altered frequencies.

28 Claims, 24 Drawing Figures

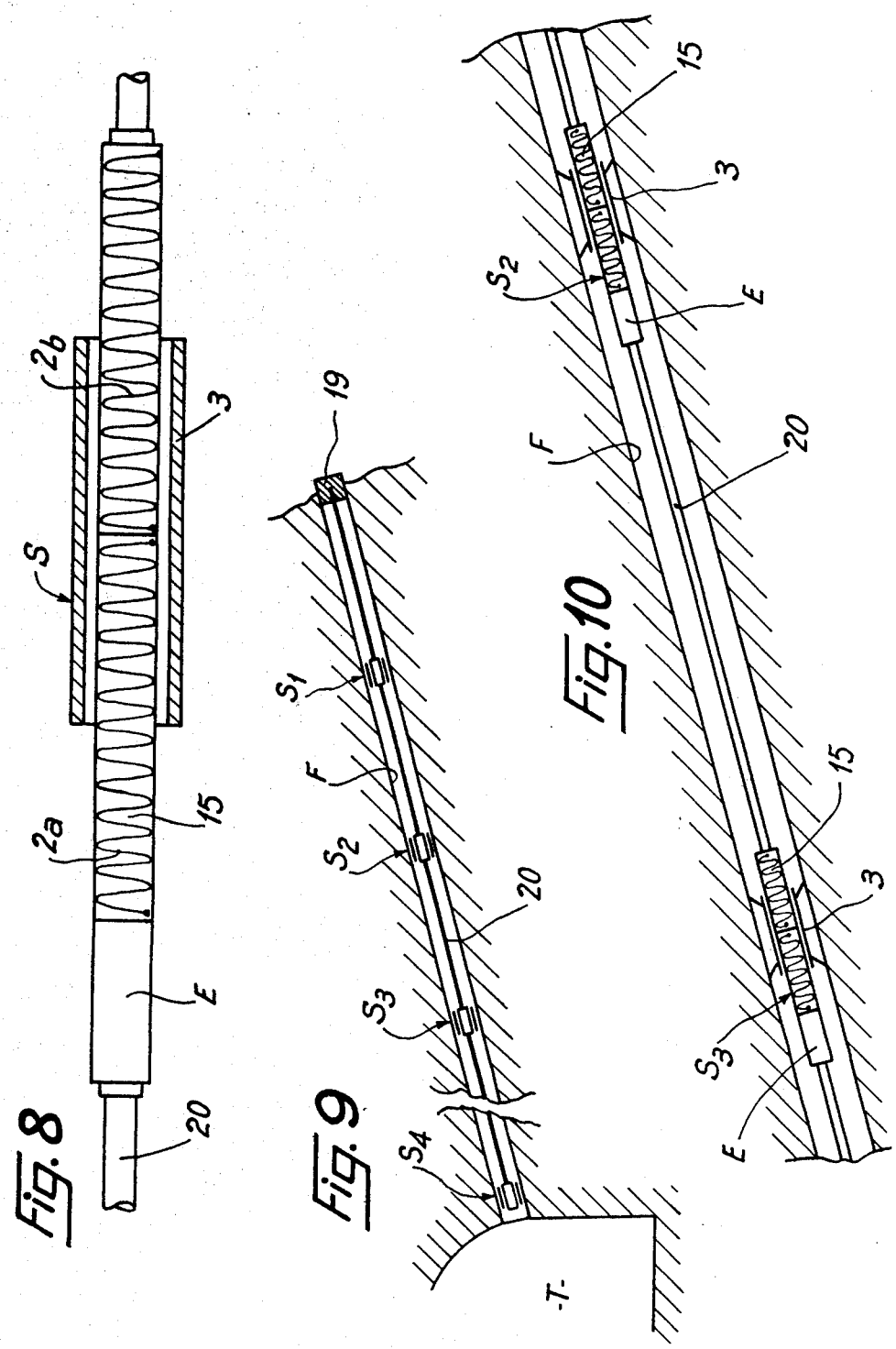

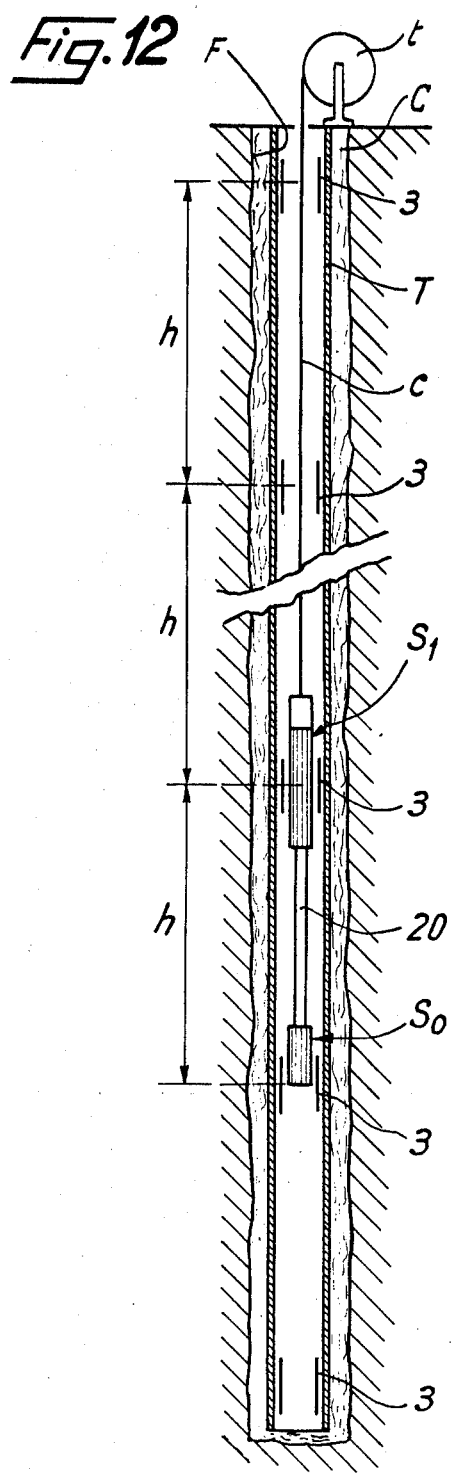
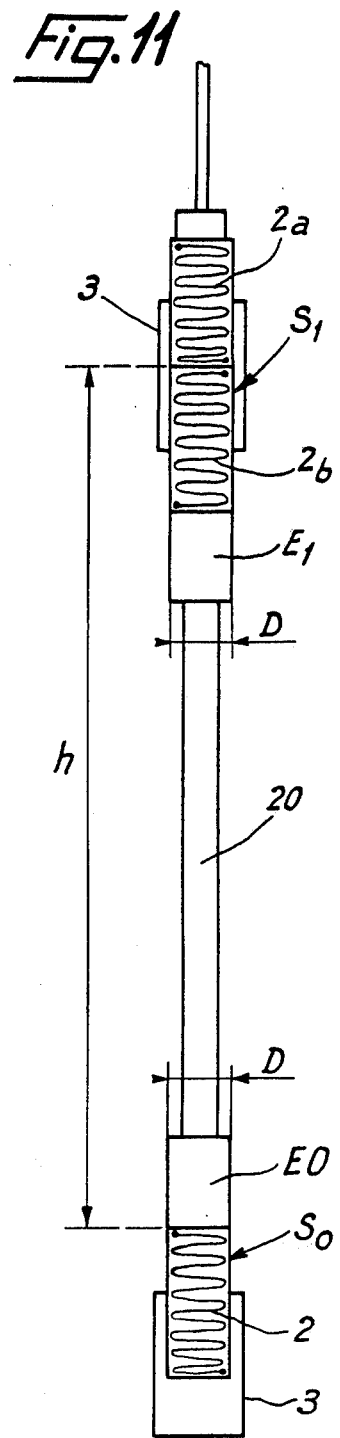

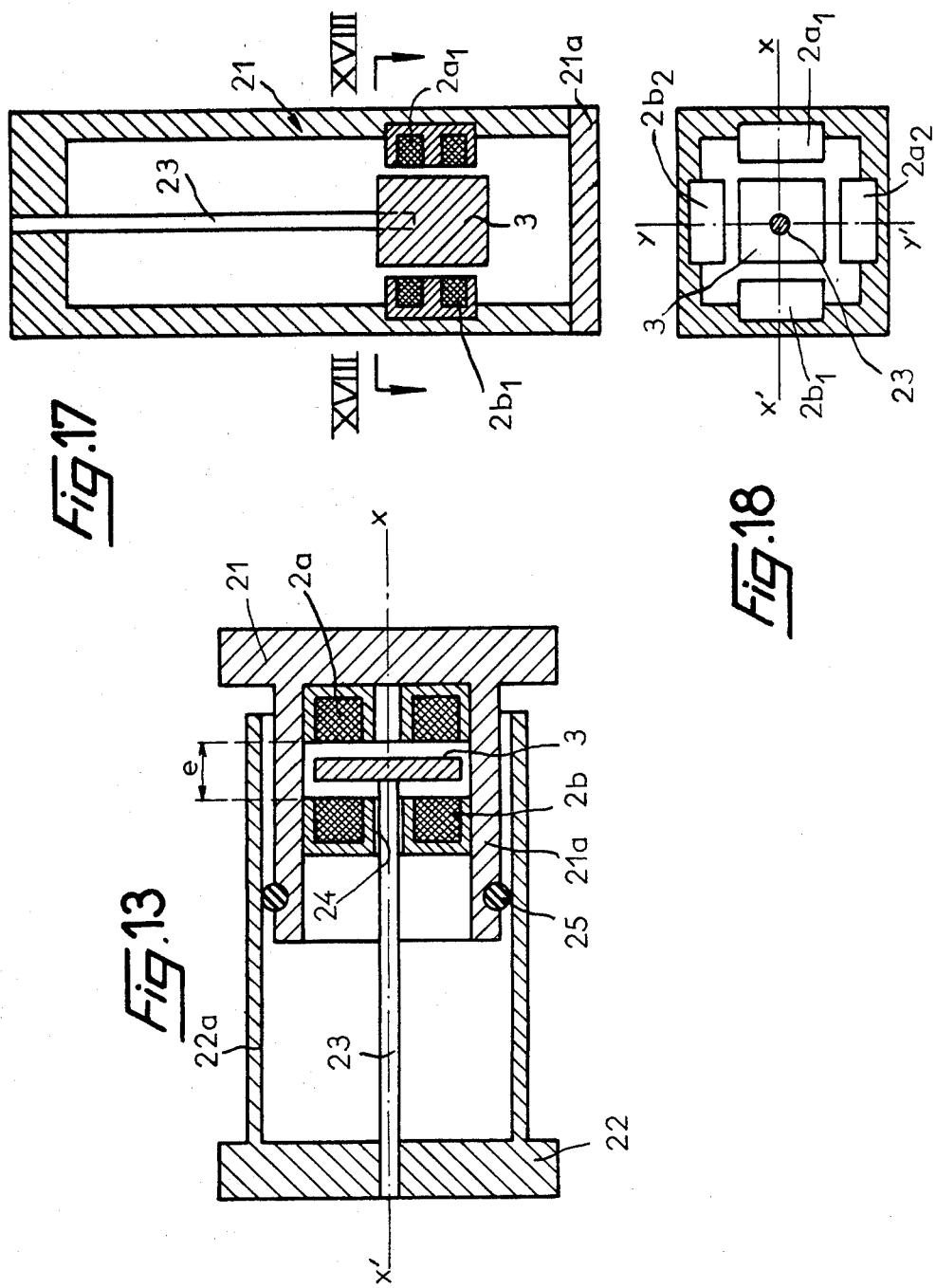

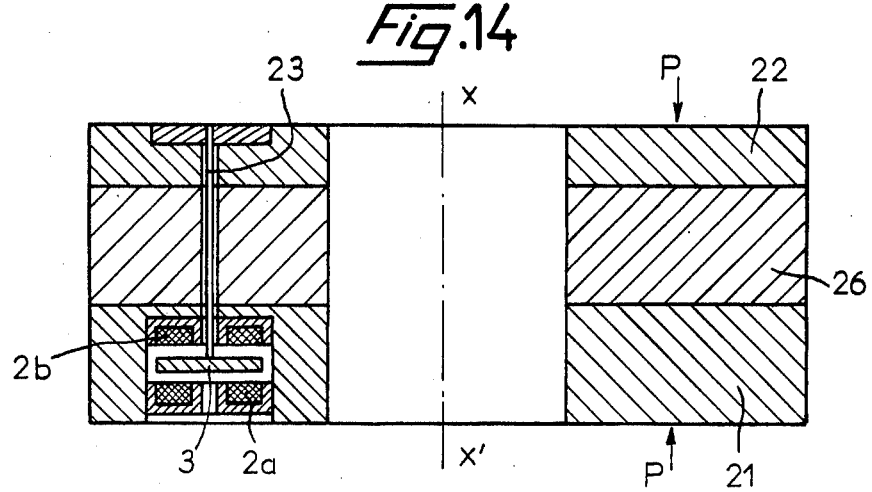
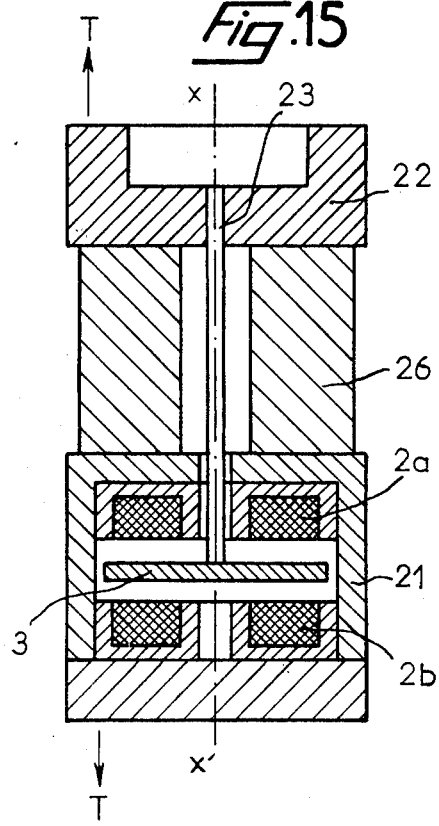
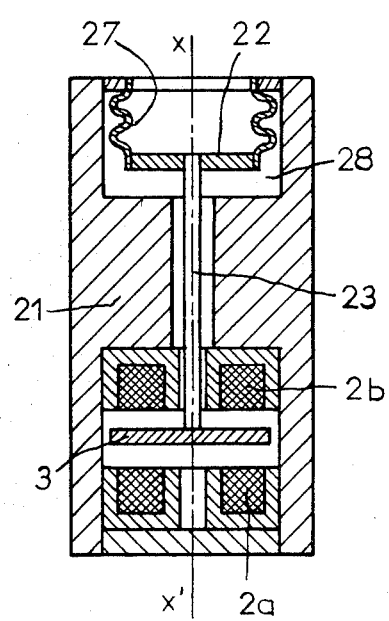

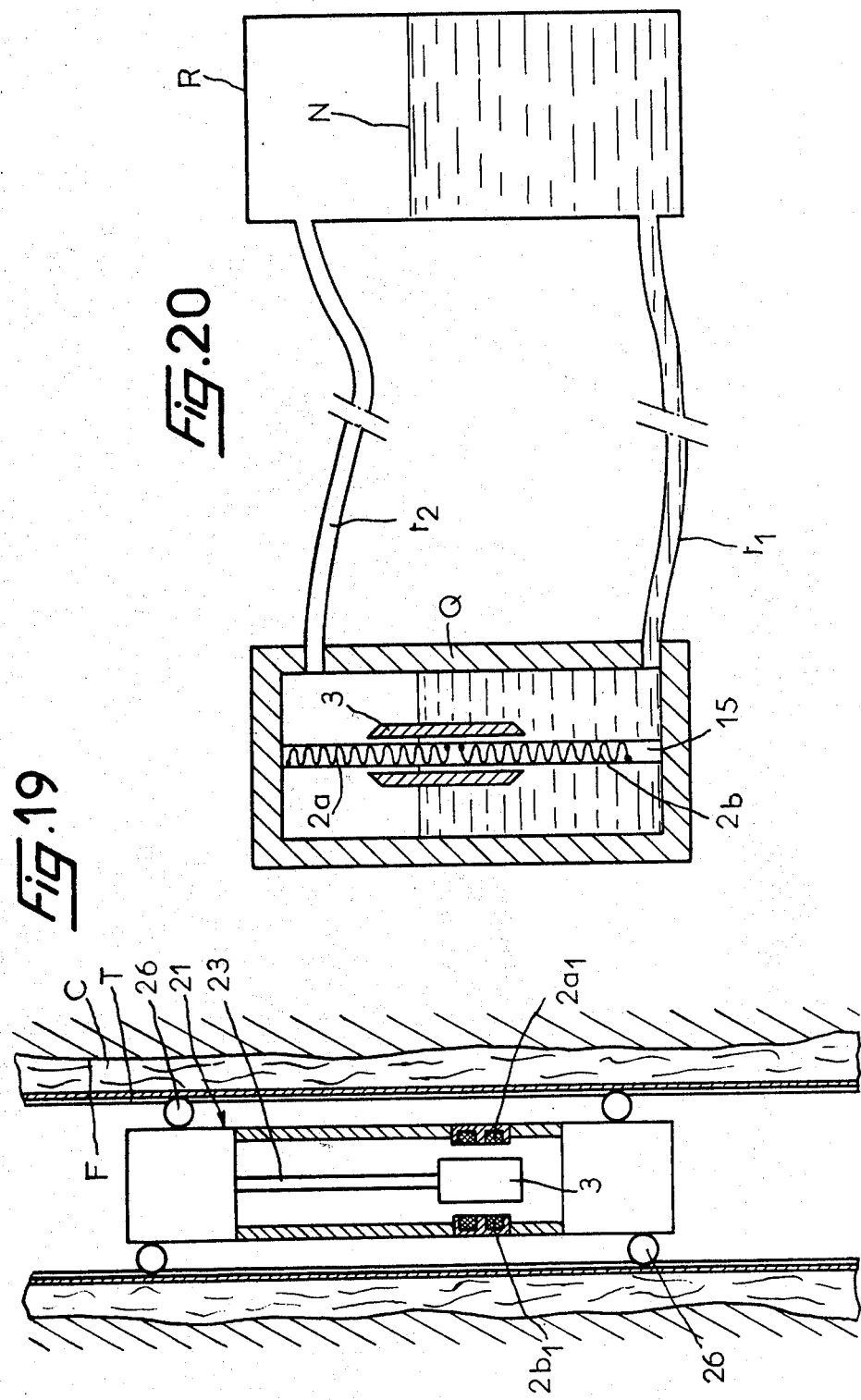

ative measuring device according to the present invention,
equipped with the two pick-ups illustrated in FIG. 2.

DEVICE FOR THE PRECISE MEASUREMENT OF MOVEMENTS OR DEFORMATIONS

BACKGROUND OF THE INVENTION

The present invention relates to a device for the precise measurement of movements or deformations.

Numerous devices are already known which permit the measurement of relatively slight movements or deformations, but there are difficulties in producing such devices that are also robust and able to withstand adverse environmental conditions.

SUMMARY OF THE INVENTION

A first object of this invention is to produce a device for this function possessing sufficient precision, fidelity and robustness for making it possible to carry out measurements of relatively slight movements or deformations on ground, in boreholes, in tunnels, in works of art or various structures, and in general for all applications for which the qualities of precision and fidelity generally required of measuring instruments must be compatible with robustness and considerable insensitivity to severe environmental conditions.

Another object of the invention is to produce a device for the precise measurement of movements or deformations, substantially comprising at least one pair of movement transducers or pick-ups, with variable reactances, adapted so that, for one and the same movement or one and the same deformation, their respective reactances vary by substantially equal amounts of opposite sign, an electronic oscillator, automatic switching means to connect the reactances of the two pick-ups alternately to one and the same point of the circuit of the said electronic oscillator, with a switching frequency of appropriate value, and means to derive a measured value proportional to the difference $(f_1-f_2)$ of the values to which the frequency f of the oscillator is thus switched.

A preferred embodiment of the device according to the present invention further comprises means to determine the mean of the difference $(f_1-f_2)$ over a predetermined period, specifically to count, over the same predetermined period, the number of oscillations at frequency $f_1$ and to subtract from it the number of oscillations of frequency $f_2$. The two pick-ups or transducers may comprise inductive reactances, each comprising an electrically conductive winding and an induction element of a magnetic material, such as soft iron or a ferrite, or else of an electrically conductive non-magnetic material, one of the said windings and induction element being fixed and the other movable and coupled rigidly to the object of which the movements or deformations are to be measured.

In another embodiment of the invention, the pick-ups or transducers comprise capacitive reactances, each comprising a fixed metallic armature, a movable metallic armature rigidly coupled to the object of which the movements or deformations are to be measured, and a rigid dielectric adapted to fill completely the space between the two armatures in every position of the movable armature, e.g. vacuum, a gas or a liquid.

By way of example, a number of embodiments of the measuring device according to the present invention, intended for various applications, have been described herein below and illustrated schematically in the accompanying drawings.

BRIEF DESCRIPTION OF THE DRAWINGS

FIG. 8 illustrates a probe equipped with a movement measuring device according to the present invention, in elevation and in partial section through an axial plane.

FIG. 9 illustrates the use of probes of the form shown in FIG. 8 to measure earth movements in a bore-hole of short length.

FIG. 10 is a larger scale view of a detail of FIG. 9.

FIG. 11 illustrates a pair of probes equipped with movement measuring devices according to the present invention.

FIG. 12 illustrates the application of the pair of probes shown in FIG. 1 to measure earth movements in a deep vertical borehole.

FIG. 13 shows a device according to the present invention for measuring slight movements, due for example to the formation of cracks, the said device being arranged so as to be capable of being embedded in a material such as concrete.

FIG. 14 shows schematically, in section through an axial plane, a dynamometer device according to the present invention, permitting the measurement more particularly of compression strains.

FIG. 15 shows schematically, in section through an axial plane, a variant of the dynamometer device of FIG. 14, permitting the measurement of tension, strains.

FIG. 16 shows schematically, in a section through an axial plane, a device according to the present invention suitable for use as a manometer.

FIG. 17 shows schematically, in section through an axial plane, a device according to the present invention adapted to measure the inclination of an element.

FIG. 18 is a view in section on line XVIII—XVIII of FIG. 17.

FIG. 19 illustrates the application of the device shown in FIGS. 17 and 18 for the purpose of measuring the inclinations at different points of a borehole.

FIG. 20 illustrates schematically a device according to the present invention adapted to measure the level of a liquid in a tank.

DESCRIPTION OF THE PREFERRED EMBODIMENTS

Figure 1:
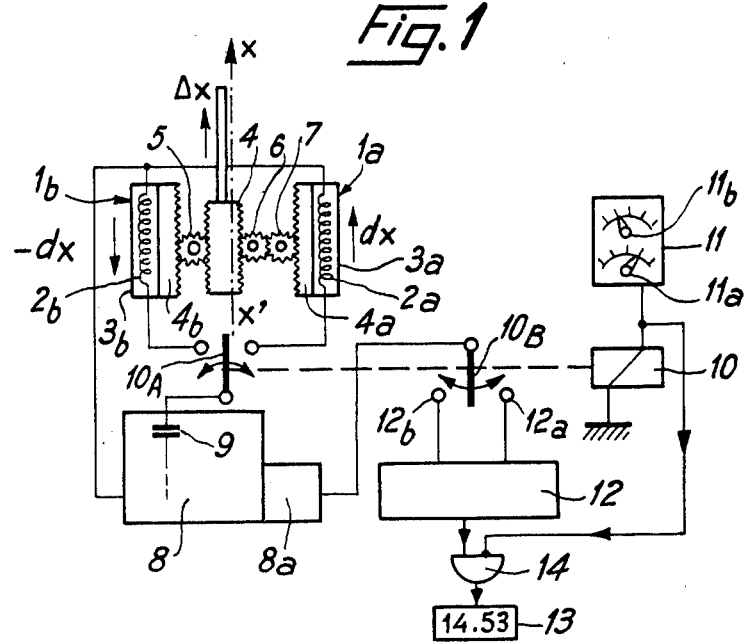
FIG. 1 is an electric block circuit diagram of one embodiment of the measuring device according to the present invention.

The movement measuring device according to the present invention, the electric block circuit diagram of which is illustrated in FIG. 1, comprises firstly a single pair of movement pick-ups, 1a, 1b, of the variable inductive reactance type; each pick-up, e.g. 1a, comprises an electrically conductive winding 2a and an induction element 3a made of a magnetic material, such as soft iron or a ferrite, or else of an electrically conductive non-magnetic material e.g. aluminum. In the embodiment considered the electrical windings 2a and 2b are fixed, whereas the induction elements 3a and 3b, e.g. tubular aluminum sleeves, respectively coaxial with the windings 2a and 2b, are movable along their respective axes; the two movable induction elements 3a and 3b are coupled rigidly to the object of which the movements are required to be measured, so that, for one and the same movement to be measured, the positions of the said movable induction elements 3a and 3b with reference to their respective fixed windings 2a and 2b vary by equal distances, but in opposite directions; consequently if the two pick-ups are constructed so as to be practically mutually identical, their respective inductive reactances vary, for one and the same movement to be measured, by substantially equal quantities of opposite signs.

A plurality of different embodiments of the means permitting the movable induction elements 3a and 3b to be coupled to the object of which the movements are required to be measured will be described herein below; in FIG. 1 it has been assumed that the movements to be measured occur along an axis x'-x, parallel to the respective axes of the two windings 2a and 2b, and that the couplings previously mentioned of the two movable induction elements 3a and 3b to the object of which the movement is required to be measured (this object not being shown in FIG. 1) are effected by a double rack 4 fixed to the said object, two racks 4a and 4b respectively integral with the two movable induction elements 3a and 3b, and three pinions 5, 6 and 7 co-operating with the said racks 4, 4a and 4b; this mechanism is such that, for any movement of the object in the direction of the arrow $\Delta x$, the movable induction element 3a undergoes an axial movement dx in the same direction as $\Delta x$, and the movable induction element 3b undergoes an axial movement $-dx$ of the same amplitude but in the opposite direction. Obviously the coupling mechanism may be dimensioned in known manner so that the movements dx and $-dx$ have amplitudes much greater than $\Delta x$.

In FIG. 1, the block 8 represents an electronic oscillator, of whose circuit only the capacitor 9, of fixed value, is shown; 10 designates a changeover switch which has been shown in the form of an electromechanical relay, comprising two reversing contacts 10A and 10B. The coil of said relay 10 is supplied from a time base 11 producing rectangular current pulses the repetition frequency of which can be adjusted by means of an element 11a and the total functioning period of which can be regulated by means of an element 11b. Obviously the elements 10-10A-10B and 11 are preferably constituted in known manner by electronic circuits, particularly semiconductorized, of equivalent functions to those which have just been stated.

As will be seen in FIG. 1, the windings 2a and 2b of the inductive reactances of the two pick-ups 1a and 1b are connected alternately by the reversing contact 10A of the relay 10 to one and the same point of the circuit of the sustained electron oscillator 8, namely to one of the plates of its fixed capacitor 9, with a switching frequency corresponding to the repetition frequency of the pulses produced by the time base 11; then, e.g. during the period of each of the pulses produced by the time base 11 and applied to the coil of the relay 10, the oscillating circuit of the electronic oscillator 8 is formed substantially by the fixed capacitor 9 and the inductance of the winding 2a of the pick-up 1a, which depends upon the position of the tubular induction sleeve 3a, whereas, during the intervals between the said pulses, the oscillating circuit of the oscillator 8 is formed by the fixed capacitor 9 and the inductance of the winding 2b of the pick-up 1b, which depends upon the position of the tubular induction sleeve 3b. If $f_1$ designates the frequency of the electrical oscillations produced by the electronic oscillator 8 when its fixed capacitor 9 is connected by the reversing contact 10A to the winding 2a, and $f_2$ designates the frequency of its oscillations when the said capacitor 9 is connected to the winding 2b, and, further if the abscissa $x_0$ is plotted to define the respective positions on the respective axes of the windings 2a and 2b of the middle sections of the tubular elements 3a and 3b when the latter coincide with the middle turns of the corresponding windings, the inductances of the latter are functions $L_1(x)$ and $L_2(x)$ of positions x of the said middle sections of the tubular elements 3a and 3b with reference to the axis x'-x. The values to which the frequency f of the electronic oscillator 8 is switched by the reversing contact 10A are given by the formulae:

$$f_1 = \frac{1}{2\pi \sqrt{L_1(x) \cdot C}} \tag{1}$$

$$f_2 = \frac{1}{2\pi \sqrt{L_2(x) \cdot C}} \tag{2}$$

When, due to a movement $\Delta x$ of the rack 4, the tubular induction element 3a has undergone a movement dx from its mean position defined by $x_0$, the tubular induction element 3b having subsequently undergone a movement $-dx$ starting from the said mean position, the difference of the values $f_1$ and $f_2$ of the frequency f of the sustained oscillator 8 is given by the formula:

$$f_1 - f_2 = \frac{dx}{4\pi \sqrt{C}} \cdot \left[ \frac{L_2'(x_0)}{L_2(x_0)^{3/2}} - \frac{L_1'(x_0)}{L_1(x_0)^{3/2}} \right] \tag{3}$$

The variable inductive reactances of the pick-ups 1a and 1b being also constructed so as to satisfy both the following conditions:

$$L_2(x_0) = L_1(x_0) \tag{4}$$

$$L'_2(x_0) = -L'_1(x_0), \tag{5}$$

which result essentially from the identity of structure of the two pick-ups, or at least of their respective inductive reactances, formula (3) can be stated in the form:

$$f_1 - f_2 = \left[ \frac{L_1'(x_0)}{2\pi L_1(x_0)^{3/2} \sqrt{C}} \right] \cdot dx. \quad (6)$$

which shows that the difference $(f_1-f_2)$ of the values to which the frequency f of the electronic oscillator 8 is switched by the reversing contact 10A is proportional to the movement dx, itself proportional to the movement Δx of the element (not shown) which is coupled mechanically to the rack 4; this law is obviously valid only in the first order, that is to say for a very low value of the movement dx.

According to another characteristic of the invention, the device illustrated schematically in FIG. 1 also comprises means to determine the mean of the difference $(f_1-f_2)$ over a given period, particularly means to count over the same period the number of oscillations of frequency $f_1$ and to deduct from it the number of oscillations of frequency $f_2$. In FIG. 1 said means are constituted basically by an electronic counter 12 to a counting input 12a and a subtracting input 12b of which the second reversing contact 10B of the relay 10 passes the oscillations produced by the electronic oscillator 8, alternately of frequency $f_1$ and of frequency $f_2$; in practice, an analogue-numerical converter 8a is connected to an analogue output of the oscillator 8 in order to convert the oscillations of frequency f which it produces into pulses of the same repetition frequency f (i.e. now equal to $f_1$ and now equal to $f_2$), said pulses being adapted to modulate the inputs of the counter 12. The output of the counter 12 is connected to a display device 13, e.g. through the intermediary of a logic gate 14, a blocking input of which receives directly from the output of the time base 11 the rectangular pulses generated for the coil of the relay 10.

The device illustrated in FIG. 1 and described above functions in the following manner: the output signal of the counter 12, which varies as its inputs 12a and 12b respectively receive the respective oscillations or frequency pulses $f_1$ and $f_2$, is transmitted to the display device 13 only at the end of the period determined for the calculation of the mean; this is in fact that the period, regulated by means of the element 11b, during which the time base 11 transmits rectangular pulses to the relay 10. The display device 13 may obviously be calibrated directly in the unit of length which has been chosen to measure the movement Δx of the element.

Figure 2:
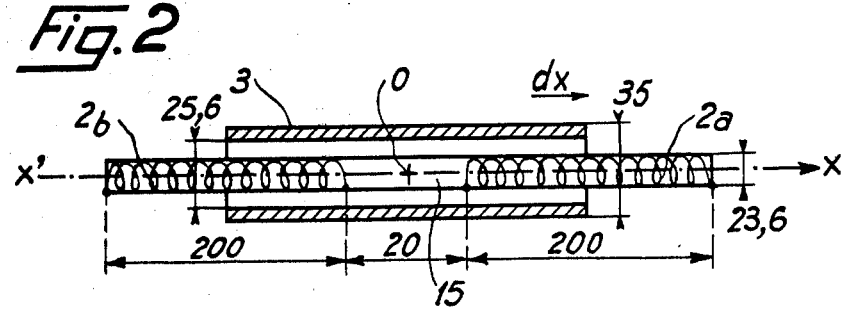
FIG. 2 shows a first embodiment of two pick-ups or transducers with inductive reactances of a device according to the present invention, in elevation and in partial section in an axial plane.

FIG. 2 shows an embodiment of two inductive reactance pick-ups or transducers for a device according to the present invention, in which the winding and the induction element corresponding to each pick-up are relatively displaceable in the direction of the axis of said winding, the axes of both windings being coincident with the windings arranged in succession to each other, and the induction elements being combined into a single common element. More specifically, the identical windings 2a and 2b of the two inductive reactances are wound one after the other onto one and the same mandrel 15, e.g. a bar of an electrically insulating and non-magnetic material; a single tubular sleeve 3 of magnetic, or non-magnetic but electrically conductive, material surrounds without contact the windings 2a and 2b wound onto the mandrel 15; the two elements 3 and 15 are concentric to the axis x'—x, one of them being fixed and the other coupled rigidly to the object of which the movement is required to be measured; it will be understood that this coupling is particularly easy to realise in the case where the movement to be measured occurs in the direction of the axis x'—x. In the initial position the middle points of the elements 3 and 15 coincide and at a point 0 on the axis x'—x which point may be taken as origin of the abscissae ($x_0=0$ in the formulae (3) to (6) herein above). With this construction it will readily be understood that the two windings 2a and 2b, magnetically coupled respectively to the two halves of the tubular sleeve 3, have in said initial position equal inductances in accordance with formula (4) herein above. It will also easily be understood that, when, e.g. the tubular sleeve 3, undergoes a movement dx towards the right-hand side of FIG. 2, the inductance of the winding 2a increases by a definite quantity, whereas that of the winding 2b diminishes by a substantially equal quantity, in accordance with relation (5) herein above, so that for a sufficiently low value of the movement dx the difference of the frequencies $(f_1-f_2)$ is substantially proportional to the movement dx, in accordance with the formula (6) herein above.

Figure 4:
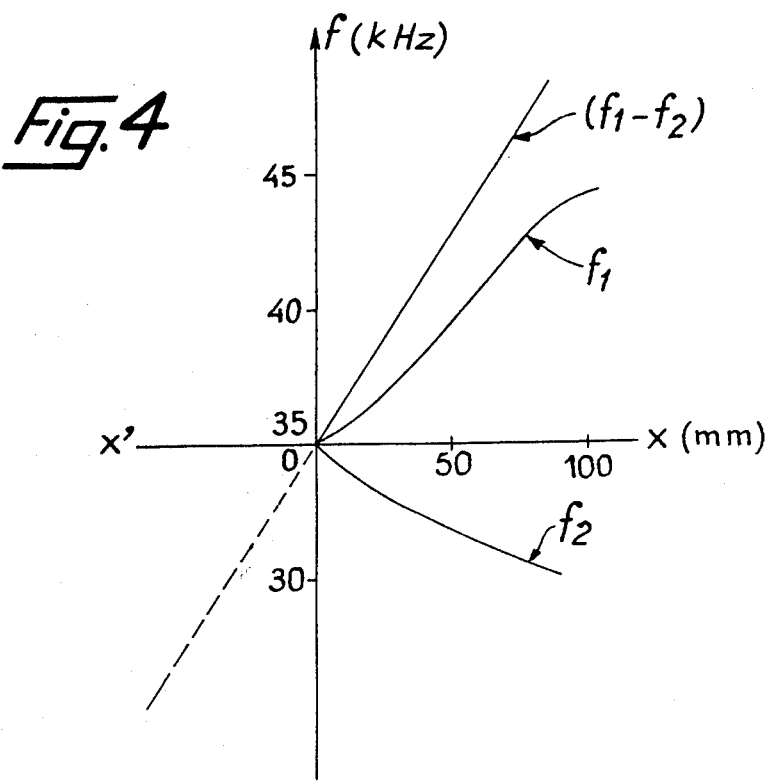
FIG. 4 shows the calibration curve of a movement measuring device according to the present invention, equipped with the two pick-ups illustrated in FIG. 2.

The calibration curve of FIG. 4 has been plotted in the case of a double pick-up having the measurements shown in millimeters in FIG. 2; the mandrel 15 may for example be made of Pyrex (Trade Mark) and the sleeve 3 of bronze; the two windings 2a and 2b each comprise 330 turns of an electrically conductive wire of diameter 0.3 mm. This calibration curve shows that $(f_1-f_2)$ is actually proportional to the movement x for a distance of approximately 85 mm to each side of the centre 0, i.e. over approximately 85% of the stroke of the movable element 3 or 15. Experience shows that the linearity of the measurement is the better as the coupling, between the elements 2a, 2b on the one hand and the element 3 on the other hand, is higher in the initial position, illustrated in FIG. 2, and that said coupling can be chosen so as to give as high a value as possible to the slope of the rectilinear part of the calibration curve.

Using the double variable inductive reactance pick-up, which is illustrated in FIG. 2, with an electronic oscillator having a fixed capacitor 9 of value C=49 μF, a frequency difference $(f_1-f_2)$ of approximately 7800 Hz was obtained for a relative movement of 50 mm in the direction of the axis x'—x; the numerical counting of the oscillations permitted, theoretically at least, an absolute precision of 1 Hz, therefore this device according to the present invention makes it possible to measure movements as slight as approximately 6 microns.

The measuring device according to the present invention, which has just been described, presents the following important advantages:

The measured quantity being a frequency changed to two different values, or the difference between said two values, it can be transmitted without alteration over long distances, which is particularly advantageous for telemetry. The measuring device according to the present invention has a to some degree "natural" central zero which is obtained when the variable inductances of the two pick-ups are exactly equal ($f_1=f_2$), e.g. in the initial position illustrated in FIG. 2). The measured quantity being proportional to the difference of two physical quantities of the same nature, particularly of two oscillation frequencies, there follows an automatic compensation of the drift phenomena due to temperature variations and ageing of the electronic components of the various circuits of the device, more particularly of the oscillator. This last advantage is particularly worthwhile for measurements performed directly on the ground, in boreholes, in tunnels, and also on civil engineering works, since such measurements, which have to be repeated over very long periods, may be made under very different temperature conditions, and also since it is desirable to eliminate the influence of the long term variations of the characteristics of the components of the measurement device, which generally being inaccessible, are frequently difficult or even impossible to replace. Lastly, by adjustment, by means of the regulating element $11a$ (FIG. 1) of the time base 11, the repetition frequency of the pulses which it delivers to the relay 10, and by adjustment, by means of its regulating element $11b$, of the duration of each measurement, it is possible to adapt the measuring device according to the present invention and its sensitivity (i.e. the slope of its calibration curve) as a function of the application envisaged, more particularly so as to be able to display the measured quantity in a unit chosen at will as a function of the application considered. In order to be able to adapt the device to the measurement of more or less rapid movements, it is possible e.g. to provide the possibility to regulate the frequency of the switching pulses produced by the time base 11 between 1 and 10 seconds.

Figure 3:
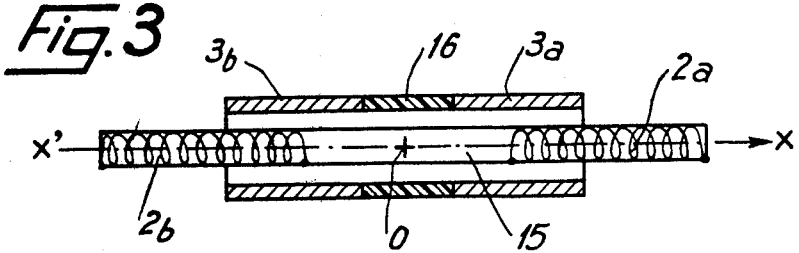
FIG. 3 shows a variant of the embodiment of FIG. 2.

In the variant illustrated in FIG. 3, the tubular sleeves $3a$ and $3b$ of the two inductive reactances are made integral by their adjacent ends through the intermediary of a connector 16 made of a non-magnetic and electrically insulating material. In other variants, not shown, the two windings $2a$ and $2b$ are wound on hollow tubular mandrels and their respective induction elements are identical rods arranged in series along the axis $x'—x$ of the tubular mandrel, respectively in juxtaposition with the corresponding windings; preferably the identical rods constituting the two induction elements are made integral by their adjacent ends, either directly so as to constitute a single rod, by analogy with the emodiment of FIG. 2, or through the intermediary of a connector made of a non-magnetic and electrically insulating material, by analogy with the embodiment of FIG. 3.

Figure 5:
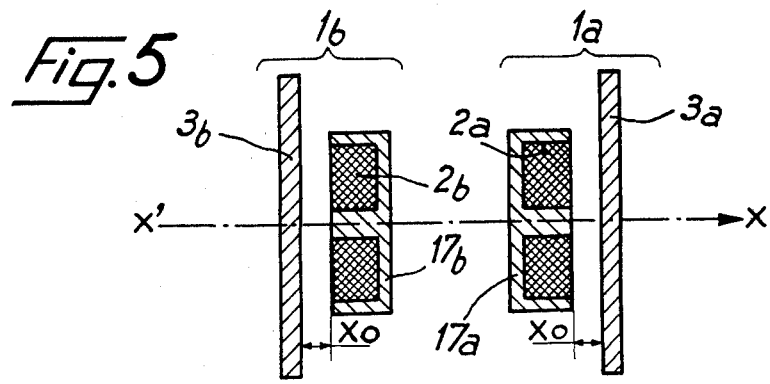
FIG. 5 shows a second embodiment of the two pick-ups or transducers with the inductive reactances of the device according to the present invention, in a section in an axial plane.

FIG. 5 shows another embodiment of two variable inductive reactance pick-ups $1a$ and $1b$ of FIG. 1. In this embodiment each inductive reactance is a flat coil $2a$ or $2b$ enveloped by a magnetic screen $17a$ or $17b$ on all sides except for one of the faces of the flat coil $2a$ or $2b$; the induction element $3a$ or $3b$ is a plate arranged opposite the open face of the corresponding flat coil $2a$ or $2b$. On the other hand, the axes of the flat coils $2a$ and $2b$ are arranged in line with each other, on the axis $x'—x$; it is then easy to couple mechanically, by means not shown, e.g. the two flat coils $2a$ and $2b$ and their respective magnetic screens with the element of which the movement is required to be measured, so that any movement of the said element is expressed by equal amplitude variations, but in different directions, of the equal spaces $x_0$, existing, in the initial positions illustrated in FIG. 5, between, on the one hand the open faces of the two flat coils $2a$ and $2b$, and on the other hand the fixed plates $3a$ and $3b$.

Figure 6:
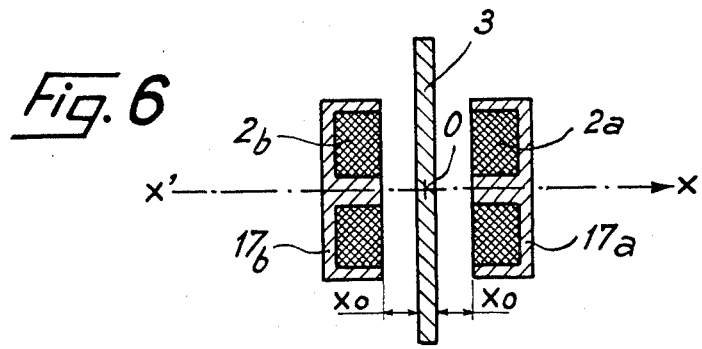
FIG. 6 shows a variant of the embodiment illustrated in FIG. 5.

In the variant illustrated in FIG. 6, the open faces of the two coils $2a$ and $2b$ are turned towards each other, and a single induction plate 3 is fitted between the said open faces of the coils $2a$ and $2b$, so that the said coils $2a$, $2b$ on the one hand and the said plate 3 on the other hand are relatively displaceable in the common direction $x'—x$ of the axes of the two coils.

In the case of this variant, the two flat coils $2a$ and $2b$ and their respective magnetic screens are preferably fixed, the single induction plate 3 then being coupled mechanically to the element of which the movement is required to be measured. In the initial position illustrated in FIG. 6, the centre of the induction plate 3 is located at the centre 0 of the space between the exposed faces of the two flat coils $2a$ and $2b$ which are therefore separated from the said plate 3 by equal spacings $x_0$.

Figure 7:
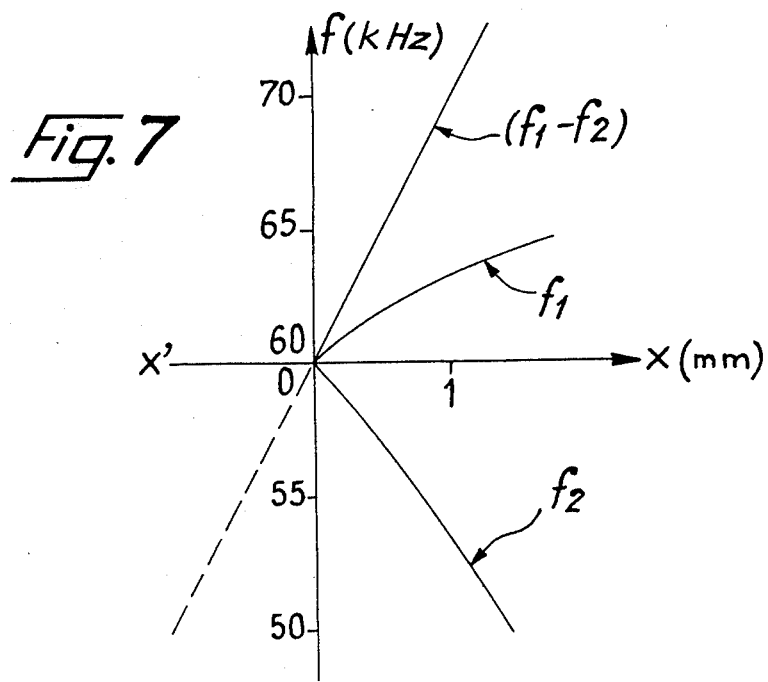
FIG. 7 is the calibration curve of a movement measuring device according to the present invention, equipped with two pick-ups illustrated in FIG. 6.

FIG. 7 shows the calibration curve of a measuring device according to the present invention equipped with the double pick-up illustrated in FIG. 6, with a brass plate 3, two flat coils $2a$ and $2b$ each comprising e.g. 72 turns, and a ferrite screen $17a$ or $17b$. Used with an electronic oscillator comprising a fixed capacitor of value $C=47$ $\mu F$, this double pick-up has yielded the calibration curve $(f_1-f_2)$ of FIG. 7, which is linear for a movement of the induction plate 3 to the right or to the left in FIG. 6, of an amplitude of about 1 mm. The corresponding frequency variation $(f_1-f_2)$ being approximately 10 kHz, the lower limit of the movements measureable by this device according to the present invention is close to 0.1 micron.

FIG. 8 shows a probe S forming a measuring device according to the present invention, comprising a double inductive reactance pick-up similar to that illustrated in FIG. 2, and also a casing E constituted e.g. by a terminal section of the hollow tubular mandrel 15 on which the two windings $2a$ and $2b$ have been wound; in said casing E there are housed at least some of the various electronic units shown in FIG. 1, more particularly the oscillator 8 with the fixed capacitor 9 and optionally the analogue-numerical converter $8a$, the switching means 10 and the time base 11, interconnected as illustrated in FIG. 1. The assembly of the mandrel 15 and the casing E, constituting the probe, is fixed to a metallic rod 20 passing e.g. through the tubular mandrel 15.

FIGS. 9 and 10 illustrate how a metallic rod 20, on which a variety of identical probes $S_1$ to $S_4$ similar to that shown in FIG. 8 are fixed, preferably at regularly spaced points in its longitudinal direction, can be used to measure the ground movements in a borehole F of short length, made e.g. in a wall of a tunnel T (FIG. 9); to this end the rod 20 carrying probes such as $S_1$ (FIG. 9) is arranged along the axis of the borehole and supported at its upper end only by an anchorage 19 in the wall of the borehole, more particularly at its top end; each of the induction elements such as 3 (FIG. 8), more particularly a tubular sleeve, which is common to both pick-ups of one and the same probe S, is fixed to the wall of borehole level with the windings of the probe, without contact with the latter, as FIG. 10 shows most clearly. Obviously, the various components of each probe S are connected by insulated conductors among themselves and also to a measuring station outside borehole F.

Initial measurements of the frequency differences $(f_1-f_2)$ for the various probes $S_1$ to $S_4$ are made, then the same measurements are repeated at definite intervals of time. By comparing the successive measurement results for each probe it is possible to determine the movements, with the passage of time, of the sections of the borehole wall to which the tubular sleeves 3 are respectively fixed, with reference to the rod 20, anchored at its upper end, and to the windings which it carries.

FIG. 11 shows a pair of probes $S_1$ and $S_0$, the first at least of which may be identical to the probe S of FIG. 8, while the second may comprise a single inductive reactance pick-up, the single winding of which is designated 2, and a casing $E_0$, enclosing only a fixed capacitor and an electronic oscillator, to which the winding 2 is connected. The two probes $S_1$ and $S_0$ are maintained rigidly one above the other, e.g. by a rigid metal bar 20, so that their respective windings are spaced vertically by a fixed distance of definite value h.

FIG. 12 illustrates how the device of FIG. 11 can be used to measure the ground movements in a deep vertical borehole F, the walls of which are e.g. lined by injected grout C and by tubing T, constituted more particularly by plastic tubes. Means such as a winch t are provided to lower the pair of probes $S_1$-$S_0$, fixed e.g. to the end of the cable c, into the borehole F and more particularly into its tubing T. Insulated conductors, forming more particularly part of an electric cable, maintain the two probes $S_1$ and $S_0$ connected permanently to a measuring station outside the borehole F. Tubular induction elements of internal diameter greater than the transverse dimensions D of the two probes $S_1$ and $S_0$ are also fixed to the wall of the borehole, more particularly to the tubing T, with spacings equal to the distance h of the windings of the said probes.

The device illustrated in FIG. 12 functions in the following manner: during an initial cycle of measurements, the descent of the pair of probes $S_1$-$S_0$ is stopped whenever the frequency of the oscillator to which the winding 2 of the probe $S_0$ is permanently connected produces an oscillation of given frequency, corresponding to a high—e.g. maximum—magnetic coupling between the said winding 2 and one of the tubular induction sleeves 3; for this position of the probe $S_0$, the probe $S_1$ has its two windings 2a and 2b coupled to the tubular induction sleeve 3 which is located at a distance h above that coupled to the single winding 2 of the probe $S_0$; the frequency difference $(f_1 - f_2)$ is then measured for the double inductive reactance pick-up constituted by the probe $S_1$ and the tubular sleeve 3 surrounding it. This measurement is repeated for each of the tubular sleeves 3 arranged in the borehole. Identical measurement cycles are then repeated at regular time intervals, and the comparison of the measurements made with the probe $S_1$ at different times, level with the same two tubular sleeves 3, permits evaluation of the vertical movement which has occurred meanwhile between the upper sleeve and the immediately lower sleeve.

FIG. 13 shows, in axial section, a device according to the present invention to measure slight movements, due e.g. to the formation of cracks. This device is equipped with a double inductive reactance pick-up of the form illustrated in FIG. 6; its flat coils 2a and 2b, and also their respective magnetic screens, are fixed on a first support 21 so that their open faces are at a fixed spacing e; the single induction plate 3 is attached to a second support 22 by a rod 23 passing freely through a central hole 24 in the screen of the flat coil 2b. The two supports 21 and 22 are, in this embodiment, fluid-tight cylinders coaxial with the flat coils 2a, 2b and with the rod 23, of which the respective skirts 21a and 22a are fitted freely slidingly one inside the other, with interposition of an annular seal element 25. The whole of the device, being essentially fluid-tight, can be embedded in a material such as concrete, so as to detect e.g. the formation of cracks therein producing a relative movement of the supports 21, 22 in the direction of their common axis x'—x. The stroke of the plate 3 between the two fixed coils 2a and 2b is preferably of the order of a millimeter, and this device makes it possible to measure movements of the order of 1/10000 of a millimeter.

The dynamometer according to the present invention which is shown schematically in FIG. 14 likewise comprises two supports 21 and 22 in the form of discs or rings on the same axis x'—x, between which there is interposed a disc or a ring of a material 26 that is deformable, more particularly by compression. This device preferably comprises three pairs of inductive pick-ups of the type illustrated in FIG. 6, each comprising a first and a second flat coil 2a and 2b, arranged in the first support 21, at an apex of an equilateral triangle with axis of symmetry x'—x, the first coils such as 2a on the one hand the second coils such as 2b on the other hand being respectively connected in series; lastly the induction plate 3 of each double pick-up is attached to the other support 22 by a rod 23 passing through the deformable material 26. The whole constitutes a "dynamometer wedge" which can be used, in a device according to the present invention, to measure the compression forces P which are applied to it parallel to the axis x'—x.

The variant illustrated in FIG. 15 can likewise be used as a dynamometer, to measure tension forces T; it differs from that illustrated in FIG. 14 solely by the fact that it comprises only one double inductive reactance pick-up, and that the interposed layer 26 is constituted by a material deformable by tension, e.g. an elastic material.

FIG. 16 shows a device according to the present invention which can be used as a manometer; its construction differs from that of the device illustrated in FIG. 15 solely by the fact that it does not have an intermediate layer of a deformable material, and that its second support 22 is arranged so as to be subject to the pressure of the fluid to be measured; for example, the support 22 in the form of a disc is attached by elastic bellows 27 to the adjacent upper part of the support 21, so as to define a chamber 28; if vacuum prevails in the latter, an absolute manometer is attained; if atmospheric pressure prevails there, this manometer permits the measurement of relative pressures; finally, a differential manometer can be obtained by causing the two opposite faces of the disc-shaped support 22 to be subjected to fluids under different pressures.

FIGS. 17 and 18 show a device according to the present invention to measure inclinations. This device substantially comprises a support in the form of a parallelepipedic casing 21, the base 21a of which may be placed upon the element of which the inclination is required to be measured. Inside the casing 21 two pairs of coaxial flat coils $2a_1$-$2b_1$ $2a_2$ and $2b_2$ are arranged with their axes x'—x and y'—y mutually perpendicular so that the said coils surround without contact a single induction plate 3 of parallelepipedic shape which is suspended from a fixed point of the upper part of the casing 21, e.g. by a flexible rod 23.

FIG. 19 illustrates the application of the device of FIGS. 17 and 18 to the measurement of inclinations at different points of a borehole F, the wall of which is lined by an injected grout C and plastic tubing T. Means are provided to move the support 21 along the borehole F, and more particularly its tubing T, whilst guiding it by the wall of the latter, by the interposition of appropriate guide elements. In the embodiment considered, said guide elements are e.g. rollers 26 mounted for free rotation on the external wall of the casing-shaped support 21, and rolling in longitudinal guide grooves made in the wall of the tubing T. In the case of a vertical borehole F the casing 21 may be suspended from the lower end of a cable analogously to the arrangement in FIG. 12.

FIG. 20 shows schematically a device according to the present invention to measure the level N of a liquid in a tank R. This device according to the present invention preferably comprises a space Q, independent of the tank R, the bottom and top parts respectively of Q and of R being connected by appropriate pipes $t_1$ and $t_2$. The mandrel 15 of a double inductive reactance pick-up of the form illustrated in FIG. 2 is fixed with its axis $x'—x$ vertical, inside the space Q. The common induction element 3 is a tubular sleeve which surrounds without contact the windings $2a$ and $2b$ wound on the mandrel 15, and which is constructed so as to constitute a float.

Figure 21:
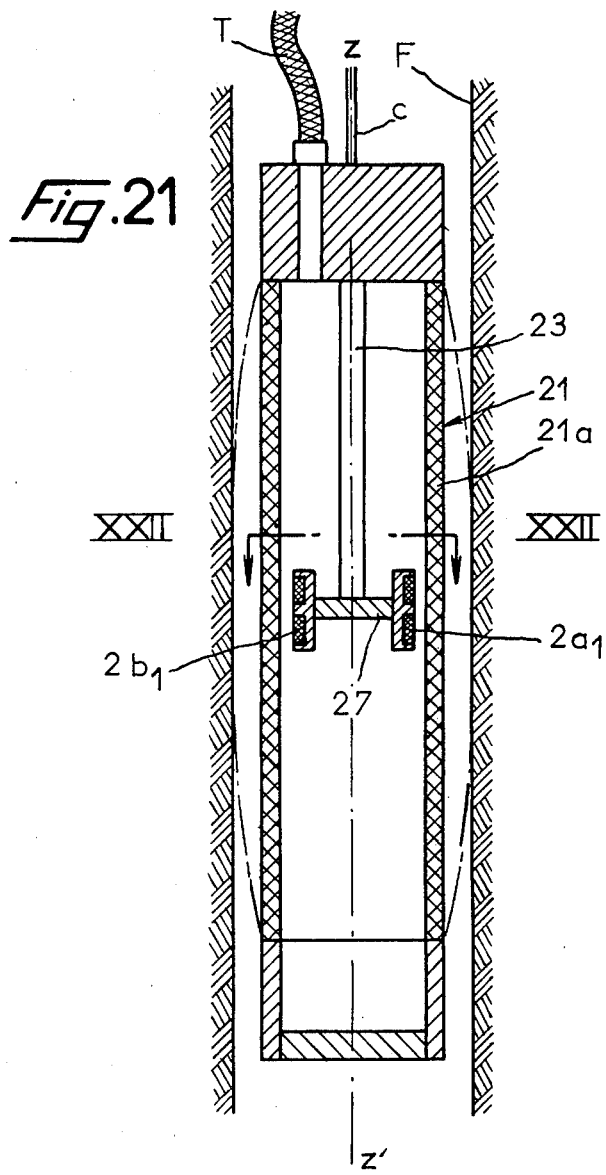
FIG. 21 shows schematically, in section through an axial plane, a hollow cylindrical probe equipped with a device according to the present invention, permitting the deformability of the wall of a borehole to be measured.
Figure 22:
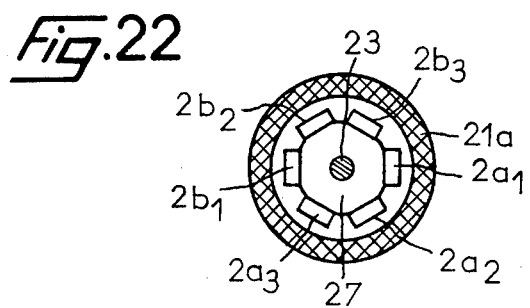
FIG. 22 is a section on line XXII—XXII of FIG. 21.

FIGS. 21 and 22 show schematically a device according to the present invention to measure the deformability of the wall of a borehole F. This device comprises a hollow cylindrical probe 21, the lateral wall $21a$ of which is substantially constituted by a deformable tube of metal braid, of slightly smaller diameter than that of the borehole F. The flat coils of a plurality of pairs—e.g. three pairs of inductive pick-ups $2a_1-2b_1$, $2a_2-2b_2$ and $2a_3-2b_3$ are arranged at the apices of a regular polygon, of same axis $z'—z$ as the cylindrical probe 21, near its lateral wall $21a$, acting as a common induction plate. The six flat coils are e.g. carried by a support plate 27 of non-magnetic and electrically insulating material, which is attached by a rod 23 of the same nature to the top part of the casing 21 of the probe. Means, comprising e.g. a tube T coming from the outside of the borehole F, are provided to introduce a fluid under pressure to the interior of the casing 21 of the hollow probe, so as to apply its lateral wall $21a$, which is deformable, against that of the borehole F, with a given pressure, as indicated by the broken lines in FIG. 21. The probe 21 is suspended e.g. at the end of a cable c, which permits the measurement to be repeated at different points of the borehole F, e.g. at different depths in the case of a vertical borehole.

In all the foregoing examples of the invention in which only the inductive pick-ups and their associated mountings have been shown, it will be understood that an electrical circuit arrangement corresponding to that in FIG. 1 can be employed to evaluate the signals generated.

Figure 23:
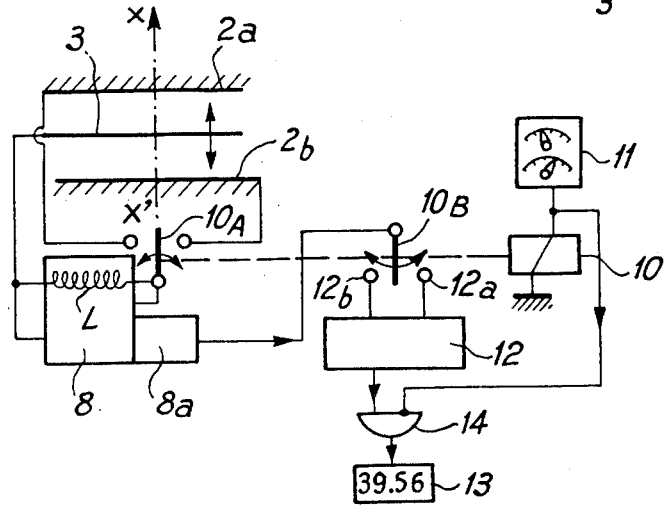
FIG. 23 is the electrical block circuit diagram of a measuring device according to the present invention equipped with two movement pick-ups or transducers with capacitive reactances.

FIG. 23 is the electric block circuit diagram of another embodiment of the movement measuring device according to the present invention and which is capable of use in the manner of the devices already described above. This alternative arrangement differs from that illustrated in FIG. 1 only in that it comprises two variable capacitive reactances each comprising a fixed metal plate $2a$ or $2b$, a movable metal plate 3, coupled rigidly to the object (not shown), the movements or deformations of which are required to be measured, and a dielectric suitable to fill completely the intervals between the plates $2a$, $2b$ and 3; ated in FIG. 23, the two capacitive reactances of the two pick-ups have a common movable plate 3 which is constituted by a plate fitted parallel to and between the two fixed plates $2a$ and $2b$, likewise plane, the said plate 3 being movable in the direction $x'—x$, perpendicular to the fixed plates $2a$ and $2b$. In the variant partially illustrated in FIG. 24, the common movable plate 3, plane as are the two fixed plates $2a$ and $2b$, is fitted movably in a direction $x'—x$ parallel to the two fixed plates; the movable plate 3 is preferably guided so as to remain constantly at an equal distance from the two fixed plates $2a$, $2b$.

The other elements of the device illustrated in FIG. 23 differ little from the elements having the same references in the embodiment illustrated in FIG. 1; however the fixed capacitor C of FIG. 1 is replaced in the electronic oscillator 8 by a self-inductance L of fixed value.

Figure 24:
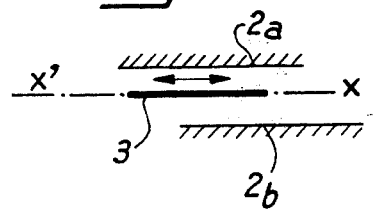
FIG. 24 illustrates schematically a variant of the embodiment of the capacitive reactance pick-ups of FIG. 23.

The two capacitive reactances shown schematically in FIGS. 23 and 24 are capable of different constructions, all coming within the ambit of the invention; they could more particularly comprise curved plates.

I claim:

1. Device for the precise measurement of movements or deformations, comprising, in combination, at least one pair of variable reactance movement pick-ups mounted relative to each other to act as electrical transducers responsive to the same movement or deformation and arranged so that the reactances of the respective pick-ups are varied thereby by substantially equal but opposite amounts, electronic oscillation means for co-operation with said pick-ups, switching means between said pick-ups and said oscillation means for connecting the reactances of the pick-ups alternately to a corresponding point in the oscillation means whereby to alter the oscillation frequency of the oscillation means in dependence upon the different reactances of the respective pick-ups alternately and evaluation means connected to said oscillation means for deriving an output proportional to the difference of the altered frequencies of said oscillation means caused by said reactances.

2. Device according to claim 1, further comprising means to determine the mean of said frequency difference over a predetermined period and including means for counting during the said predetermined period the number of oscillations of one of said altered frequencies and means for subtracting therefrom the number of oscillations of the other of said altered frequencies.

3. Device according to claim 1, wherein the said pick-ups comprise inductive reactances, each having an electrically conductive winding and an induction element in a magnetic or electrically conductive material, in each pick-up one of the said winding and induction element being fixed and the other being movable and coupled rigidly to an object of which the movements or deformations are to be measured.

4. Device according to claim 3, wherein each winding has a central axis, and the winding and the induction element of the inductive reactance of each pick-up are relatively displaceable in the direction of the axis of the said winding.

5. Device according to claim 4, wherein the axes of the windings of the two inductive reactances are arranged each in axial succession to each other.

6. Device according to claim 5 wherein said inductive reactances comprise a common induction element.

7. Device according to claim 5, wherein the windings of the two inductive reactances are identical and are wound one behind the other onto the same mandrel, and their respective induction elements are identical elongate parts disposed in series and extending along but not contacting the corresponding windings.

8. Device according to claim 7, wherein the said mandrel is tubular and has a longitudinal axis, the said elongate parts being arranged along said axis, respectively level with their associated windings.

9. Device according to claim 7, wherein the said elongate parts are tubular sleeves surrounding but not contacting the associated windings on the said mandrel.

10. Device according to claim 7, wherein the said elongate parts have mutually adjacent ends integrally arranged so that said parts form a unitary elongate member.

11. Device according to claim 7, wherein the said elongate parts have mutually adjacent ends and a connecting part joining said elongate parts integrally through said ends, said connecting part being made of a non-magnetic and electrically insulating material.

12. Device according to claim 3, for measurement of ground movements in a borehole having a wall of short length, comprising a rigid metal rod arranged along the axis of the borehole to extend along the wall of the borehole, an anchorage at the upper end of said rod forming its sole support in the wall of the borehole, a plurality of probes fixed to the said rigid rod at points spaced along its longitudinal direction, each probe comprising at least the windings of said two pick-ups, the electronic oscillation circuit and switching means, insulated conductors connecting the probes among themselves and to a measurement station outside the borehole, the induction elements of the two pick-ups of each probe being formed by a common element fixed to the wall of the borehole level with the windings of the associated probe and without contact with said windings.

13. Device according to claim 3 for measuring the ground movements in a deep vertical borehole, comprising a pair of identical probes each comprising at least the winding of one inductive pick-up, an electronic oscillation circuit and switching means, a rigid part maintaining the two probes one above the other so that their respective windings are separated vertically by a predetermined fixed distance, means for lowering said probes into the borehole, insulated conductors for connecting both probes to a measurement station outside the borehole, and induction elements for said pick-ups, which are fixed to the wall of the borehole at a spacing equal to said predetermined fixed distance for co-operation with the respective windings.

14. Device according to claim 13 wherein said induction elements comprise tubular sleeves of greater internal dimensions than the transverse dimensions of said probes.

15. Device according to claim 3 for measuring the level of a liquid in a tank, wherein the windings of the inductive reactances of the two pick-ups are arranged with a common vertical axis, their induction elements being formed as a common induction element adapted to float in the tank.

16. Device according to claim 3 for measuring the deformability of the wall of a borehole, comprising a hollow cylindrical probe having a deformable tubular lateral wall comprising electrically conductive material and having a diameter slightly smaller than that of the borehole, a plurality of pairs of inductive reactances comprising flat coils arranged inside the said probe and near said lateral wall, whereby said lateral wall acts as a common induction element for said reactances, and means for introducing a fluid under pressure into said hollow probe so as to urge its deformable lateral wall against that of the borehole with a predetermined pressure.

17. Device according to claim 4, wherein the winding of each inductive reactance is a flat coil, a magnetic screen surrounding said coil on all sides except one of the faces of the coil, and the induction element associated with said winding being a plate arranged opposite said one open face of the flat coil.

18. Device according to claim 17, wherein the flat coils of each pair of inductive reactances have central axes that are arranged each in axial succession to each other so that said open faces of the two coils are turned towards each other, and a common plate-form induction element is disposed between said open faces of the flat coils, so the said coils on the one hand and said plate on the other hand are relatively displaceable in the common direction of the coil axes.

19. Device according to claim 18 for measurement of small movements, comprising first and second supports, said flat coils of each pair of inductive pick-ups being mounted on the first support and a common induction plate being provided for said coils, a rod mounting said plate on the second support and a central hole in one of the two flat coils having said rod passing freely through it.

20. Device according to claim 19 adapted for use as a dynamometer, wherein the two supports have the form of coaxial discs or rings and a layer of a deformable material separates said discs or rings.

21. Device according to claim 20 having three pairs of inductive pick-ups comprising three pairs of first and second flat coils arranged on the first support, at the apices of an equilateral triangle of the same axis of symmetry as said supports, the first and the second flat coils of the three pairs of pick-ups being respectively connected in series.

22. Device according to claim 19 for use as a manometer, wherein the second support is arranged so as to be subject to the pressure of the fluid to be measured over a surface non-parallel to the rod connecting the common induction plate to said second support.

23. Device according to claim 19 for encasement in a material such as concrete, wherein the first and second supports are fluid-tight cylinders coaxial with the flat coils and having skirts mounted freely slidably one inside the other with interposition of an annular seal element.

24. Device according to claim 18 for measuring the inclination of an element, comprising a support integral with the element, two pairs of said flat coils disposed on said support, the coils of each pair being coaxial with one another and the axes of the respective pairs being perpendicular to each other, a common induction plate suspended from a fixed point of the support being surrounded by said coils without contact therewith.

25. Device according to claim 24 for measuring the inclinations at different points of a borehole, further comprising means for movement and for guidance of the support along the borehole.

26. Device according to claim 1, wherein the two pick-ups are in the form of capacitive reactances, each comprising a fixed metal plate and a movable metal plate, whereby variations of the capacitive reactance value are produced, and a non-rigid dielectric material adapted to occupy completely the space between the two plates independently of the displacement of the movable plate.

27. Device according to claim 14, wherein the capacitive reactances of the two pick-ups have a common movable plate.

28. Device according to claim 15 wherein said common movable plate is disposed parallel to and between two plane plates forming said fixed plates such that said movable plate is displaceable in a direction perpendicular or parallel to the fixed plates.

* * * * *